April 16, 1935.  E. RUPP  1,998,334
ELECTRIC RADIATION INDICATOR
Filed July 29, 1932
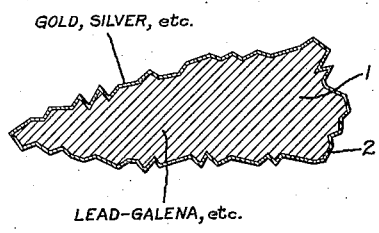
Inventor:
Emil Rupp,
by Charles E. Millar
His Attorney.

Patented Apr. 16, 1935

1,998,334

UNITED STATES PATENT OFFICE 1,998,334

ELECTRIC RADIATION INDICATOR

Emil Rupp, Glienicke-on-the-Nordbahn, Germany, assignor to General Electric Company, a corporation of New York Application July 29, 1932, Serial No. 626,247
In Germany August 13, 1931

3 Claims. (Cl. 136—89)

It is customary to employ thermo-devices and photo-electric tubes for the measurement of heat radiation and of light rays.

An object of the invention is to provide a novel electric radiation indicator which can be employed both for heat radiation and for light rays.

The radiation meter consists of the combination of a crystalline semi-conductor and a metal, in which the metal is applied to one surface of the semi-conductor as a thin layer so that it is transparent to the kind of ray to be measured. One electrode of the device is the semi-conductor, the other electrode is the metal layer.

An exemplary embodiment of the invention is shown in cross-section in the drawing. To a well-developed cubical facet of a galena crystal 1, a thin, transparent and cohesive layer 2 of gold or similar metal such as silver, copper, nickel or tungsten, is applied in high vacuum. The gold is vaporized in a small tungsten crucible and the vapor deposited onto the galena surface. The increasing thickness of the layer of gold may be observed during the process on a conveniently positioned small glass plate. The crystal with the layer of gold is placed within an enclosure having separate leading-in conductors for the crystal and the gold layer. The contact of the crystal with its conductor may be improved by providing a thick metal layer at the place of contact.

The radiation to be measured falls on the layer of gold, penetrates the same and produces an electric current between the crystal and gold. A device employing galena and gold is sensitive to heat radiation of liquid air, also of the hand and to the light radiation of red and blue colors.

The sensitivity of the radiation indicator depends on the structure of the crystal, on impurities in the galena, also on the locality in which it was found. Well-developed cubical facets are very sensitive, but galena which is composed of fine crystals is less sensitive.

Instead of the gold, other metals such as copper, silver, nickel, tungsten, bismuth, antimony and tellurium may be used; also metals of lesser sensitivity such as aluminum, zinc, magnesium or thallium. Instead of the galena, other semi-conductors may be employed, such as molybdenum sulphide or silver sulphide; also other crystal facets besides cubical facets may be coated with the metal.

Besides being produced in the manner described, the metal layer may be formed by cathode atomization or by electrolytic or thermal decomposition of soluble or volatile combinations.

The novel radiation device may be used for measuring temperatures and among other things, for measuring infra-red light for photometry, infra-red rays for telephony and for sound-films.

What I claim as new and desire to secure by Letters Patent of the United States, is:

1. A light and heat radiation indicator consisting of a single crystal of lead galena coated with a metal layer permeable to radiation.

2. A light and heat radiation indicator consisting of a single crystal of lead galena coated with a film of gold.

3. An electric radiometer comprising only a single crystal taken from a group consisting of lead sulphide, molybdenum sulphide, and silver sulphide, said crystal coated on one of its facets with a thin layer of metal taken from a group consisting of gold, copper, silver, nickel, tungsten, bismuth, antimony, tellurium, aluminum, zinc, magnesium and thallium.

EMIL RUPP.